US011239713B2

(12) United States Patent
Toida

(10) Patent No.: US 11,239,713 B2
(45) Date of Patent: Feb. 1, 2022

(54) ROTOR STRUCTURE OF MOTOR

(71) Applicant: KABUSHIKI KAISHA TOYOTA JIDOSHOKKI, Kariya (JP)

(72) Inventor: Naotaka Toida, Aichi-ken (JP)

(73) Assignee: KABUSHIKI KAISHA TOYOTA JIDOSHOKKI, Kariya (JP)

(*) Notice: Subject to any disclaimer, the term of this patent is extended or adjusted under 35 U.S.C. 154(b) by 109 days.

(21) Appl. No.: 16/619,226

(22) PCT Filed: May 11, 2018

(86) PCT No.: PCT/JP2018/018312
§ 371 (c)(1),
(2) Date: Dec. 4, 2019

(87) PCT Pub. No.: WO2018/225447
PCT Pub. Date: Dec. 13, 2018

(65) Prior Publication Data
US 2020/0153295 A1 May 14, 2020

(30) Foreign Application Priority Data
Jun. 5, 2017 (JP) .............................. JP2017-110897

(51) Int. Cl.
H02K 1/27 (2006.01)
H02K 1/28 (2006.01)
H02K 7/04 (2006.01)

(52) U.S. Cl.
CPC ............... H02K 1/276 (2013.01); H02K 1/28 (2013.01); H02K 7/04 (2013.01)

(58) Field of Classification Search
CPC ............ H02K 1/276; H02K 1/28; H02K 7/04; H02K 15/03
See application file for complete search history.

(56) References Cited

U.S. PATENT DOCUMENTS 9,385,573 B2 7/2016 Morozumi
2003/0020351 A1* 1/2003 Lee ........................ H02K 1/246
310/156.53

FOREIGN PATENT DOCUMENTS

CN 101567592 A 10/2009
JP 2001-157425 A 6/2001
(Continued)

OTHER PUBLICATIONS

Machine Translation, Takeda, JP-2009072035-A, Apr. 2009. (Year: 2009).*

(Continued)

Primary Examiner — Thomas Truong
(74) Attorney, Agent, or Firm — Sughrue Mion, PLLC

(57) ABSTRACT

A rotor structure of a motor includes a rotor core formed by laminating a plurality of laminated steel plates, a permanent magnet, and end plates. First holes and second holes are perforated alternately in a circumferential direction at equal intervals. The end plates have holes. The end plates are respectively fixed to end portions of the rotor core by fastening members inserted to the holes and the first holes. When the rotor core is divided into first laminated portions and a second laminated portion, in the second laminated portion, the plurality of the laminated steel plates adjacent to the first laminated portions are rotationally laminated in such a manner that the second holes are connected to the first holes.

4 Claims, 3 Drawing Sheets

(56) References Cited

FOREIGN PATENT DOCUMENTS

| | | | |
|---|---|---|---|
| JP | 2009-72035 A | | 4/2009 |
| JP | 2009072035 A | * | 4/2009 |
| JP | 2010-239813 A | | 10/2010 |
| PL | 225084 B1 | | 2/2017 |

OTHER PUBLICATIONS

Extended European Search Report dated May 12, 2020 in European Application No. 18813042.1.
Office Action dated Dec. 3, 2020 in Chinese Application No. 201880036844.8.

* cited by examiner

ROTOR STRUCTURE OF MOTOR

CROSS-REFERENCE TO RELATED APPLICATIONS

This application is a National Stage of International Application No. PCT/JP2018/018312 filed May 11, 2018, claiming priority based on Japanese Patent Application No. 2017-110897 filed Jun. 5, 2017, the contents of all of which are incorporated herein by reference in their entirety.

TECHNICAL FIELD

The present invention relates to a rotor structure of a motor.

BACKGROUND ART

There has been known a rotor of a motor including a rotor core formed by laminating a plurality of laminated steel plates (electromagnetic steel plates), in which permanent magnets are arranged (for example, see Patent Document 1). The rotor has a structure in which non-magnetic end plates are disposed on opposite end portions of the rotor core, and the rotor core and the end plates are fixed by fastening members such as rivets.

CITATION LIST

Patent Document

Patent Document 1: Japanese Patent Application Publication No. 2010-239813

SUMMARY OF INVENTION

Technical Problem

However, a rotor becomes longer as the number of laminated steel plates configuring a rotor core increases. This needs fastening members such as rivets having a length corresponding to a length of the longer rotor core in a case where end plates are fixed to opposite end portions of the rotor core. As a result, a fastening by using rivets or the like may not be applied to, for example, a large motor. Thus, a structure of a rotor leaves plenty of room for improvement.

It is an objective of the present invention to provide a structure of a rotor fastening a rotor core and end plates without needing fastening members that have a size corresponding to a size of the rotor.

Solution to Problem

To achieve the foregoing objective, in accordance with one aspect of the present invention, a rotor structure of a motor includes a rotor core formed by laminating a plurality of laminated steel plates, a permanent magnet disposed in the rotor core, and end plates fastened to opposite end portions of the rotor core, respectively. First holes of a first diameter and second holes of a second diameter that is larger than the first diameter are perforated alternately in a circumferential direction at equal intervals in each of the laminated steel plates. The end plates have holes through which fastening members are inserted. The end plates are respectively fixed to the end portions of the rotor core by the fastening members inserted to the holes and the first holes of the plurality of laminated steel plates including the laminated steel plates adjacent to the end plates. When the rotor core is divided into first laminated portions in which the plurality of the laminated steel plates including the laminated steel plates adjacent to the end plates are laminated, and a second laminated portion interposed between the first laminated portions, in the second laminated portion, the plurality of the laminated steel plates including the laminated steel plates adjacent to the first laminated portions are rotationally laminated in such a manner that the second holes are connected to the first holes connectively arranged in a longitudinal direction of the rotor in the first laminated portions.

This rotor structure may fasten the end plates in the first laminated portions by rotational lamination such that the second holes of the second laminated portion are connected to the first holes of the first laminated portions, with the result that the end plates may be fixed to the rotor core. Thus, it is possible to fasten the rotor core and the end plates without needing fastening members that have a size corresponding to a size of the rotor.

In the above rotor structure of the motor, the end plates may be fixed to the ends of the rotor core by holding the end plates and the laminated steel plates of the first laminated portions by bearing seats of the fastening members. This rotor structure may firmly fix the end plates to the rotor core.

In the above rotor structure of the motor, the fastening members may be rivets. This rotor structure facilitates a fastening process.

In the above rotor structure of the motor, a total hole number of the first holes and the second holes relative to the number of poles of the motor is determined on the basis of value A calculated by using the following equation (1) and (2), when P is the number of poles, n is a positive integer, and m is a positive odd integer.

$$P \div n = B \qquad \text{Equation (1) and}$$

$$B \times m = A \qquad \text{Equation (2),}$$

where value B for calculating value A in the Equation (2) is a positive even integer of the values calculated by the Equation (1), and the total hole number may be defined as a positive even integer equal to or greater than four of the values A calculated by the Equation (2). This rotor structure may appropriately determine the total hole number of the first holes and the second holes relative to the number of poles.

Advantageous Effects of Invention

According to the present invention, it is possible to fasten the rotor core and the end plates without needing fastening members that have a size corresponding to a size of the rotor.

DESCRIPTION OF EMBODIMENTS

Figure 1:
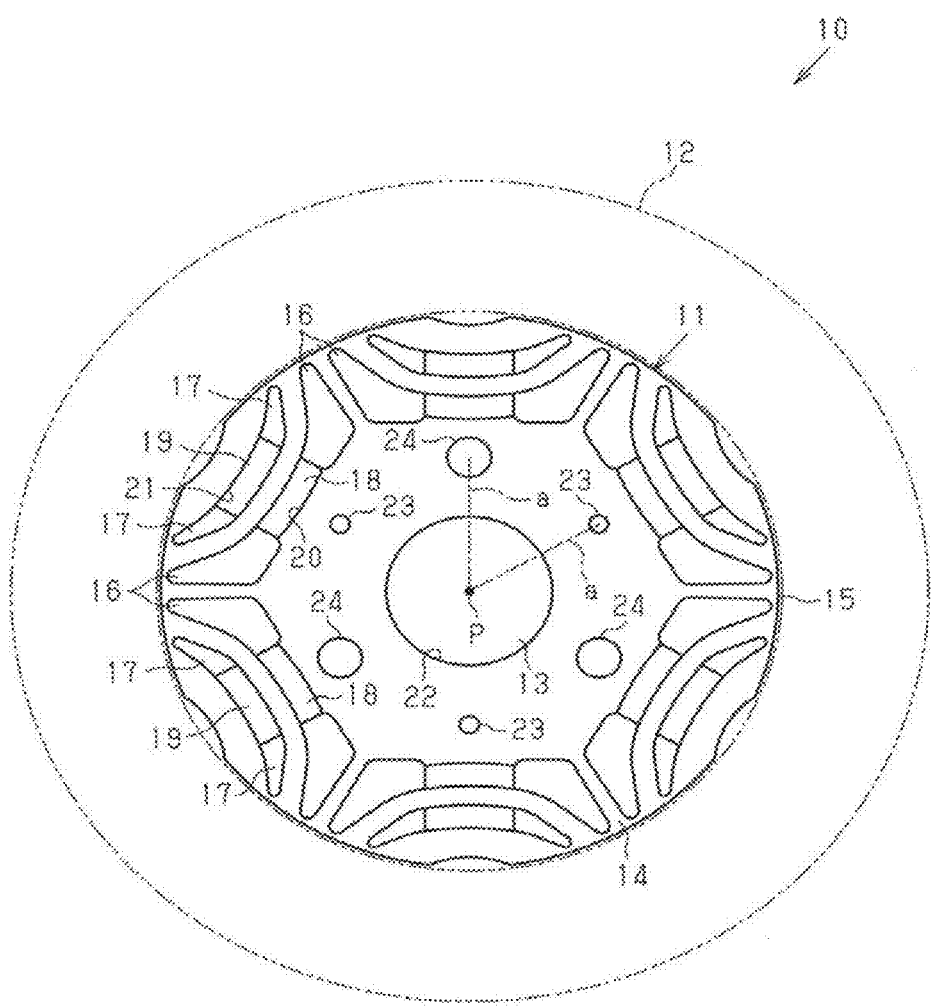
FIG. 1 is a schematic view of a motor.
Figure 2:
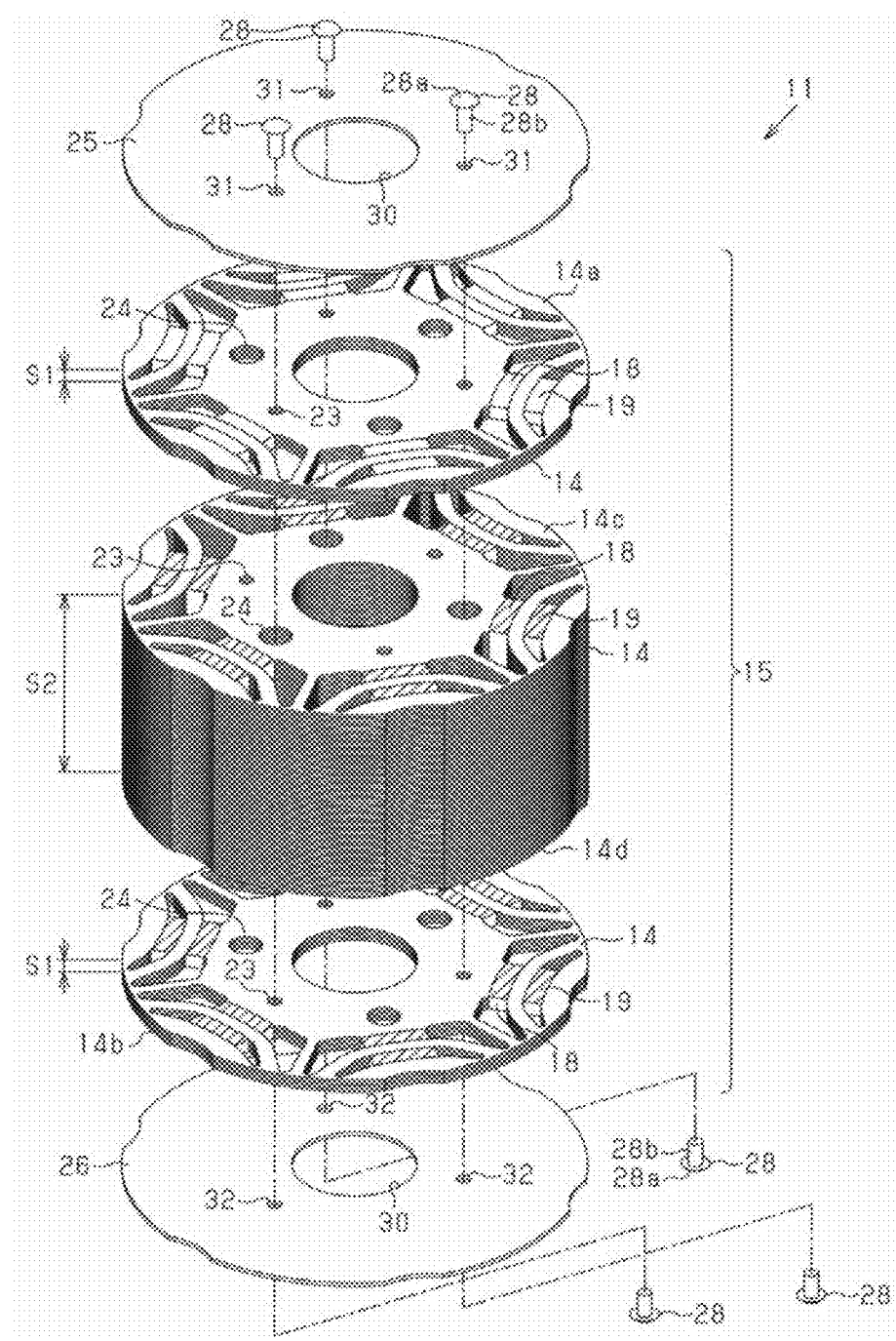
FIG. 2 is an exploded perspective view of a rotor.
Figure 3:
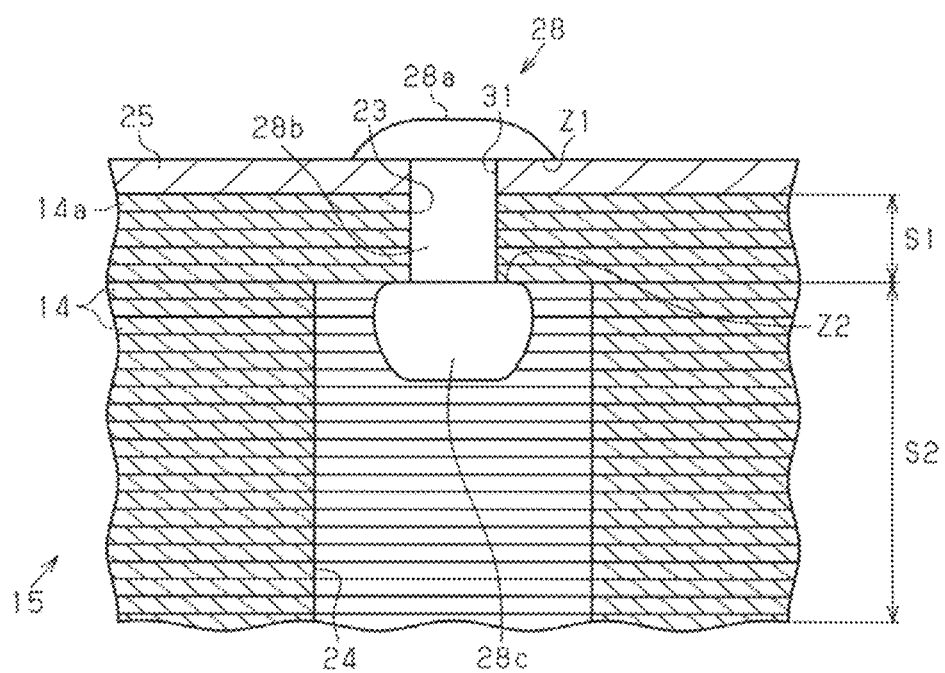
FIG. 3 is a cross-sectional view showing a fastened portion of the rotor.

The following will describe a rotor structure of a motor according to an embodiment of the present invention with reference to FIG. 1 to FIG. 3.

Referring to FIG. 1, a motor 10 is an embedded magnetic type motor, and includes a rotor 11 (rotor) and a stator 12

(stator). The rotor 11 and the stator 12 both have a cylindrical shape. The rotor 11 is disposed in an inner circumference of the stator 12. An outer circumference surface of the rotor 11 and an inner circumference of the stator 12 face each other with a gap therebetween. In FIG. 1, the rotor 11 and a shaft 13 rotatably supporting the rotor 11 are illustrated by a solid line, and the stator 12 is schematically illustrated by a two-dot chain line. The stator 12 includes a plurality of slots and teeth around which coils are wound between the slots. However, illustrations of the slots, the teeth, and the coils are omitted in FIG. 1. The motor 10 of the embodiment has "six" poles.

The rotor 11 includes a cylindrical rotor core 15 formed by laminating a plurality (for example, several dozens) of laminated steel plates (electromagnetic steel plates) 14, which each have a substantially disk-like shape. The plurality of laminated steel plates 14 configuring the rotor core 15 are each identically shaped. The rotor core 15 has therethrough the shaft 13 in a center of the rotor core 15. In this embodiment, the shaft 13 and the rotor core 15 are fixed by a shrink fitting. Then, the rotor 11 is rotatably supported by a bearing of a housing (not shown) via the shaft 13 in a state in which an outer circumferential surface of the rotor core 15 is distanced from the teeth of the stator 12 with a prescribed space.

Permanent magnets 18, 19 are embedded in the rotor core 15 in a form of a plurality of layers across flux barriers 16, 17 in a radial direction. In detail, permanent magnet holes 20, 21 are formed in the rotor core 15. In the rotor core 15, the flux barriers 16 are disposed across each permanent magnet 18 embedded in the permanent magnetic holes 20, and the flux barriers 17 are also disposed across each permanent magnet 19 embedded in permanent magnetic holes 21. The laminated steel plates 14 configuring the rotor core 15 are formed by a punching process. In the punching process, holes which may be configured of the flux barriers 16, 17 and the permanent magnet holes 20, 21 are punched. The flux barriers 16, 17 and the permanent magnet holes 20, 21 extend in a longitudinal direction of the rotor core 15 when the rotor core 15 is configured by laminating the plurality of laminated steel plates 14. The longitudinal direction of the rotor core 15 corresponds to an axial direction of the shaft 13.

Referring to FIG. 1 and FIG. 2, the laminated steel plates 14 of the embodiment have a plurality of holes perforated having different diameters around a shaft hole 22 through which the shaft 13 is inserted. The holes having different diameters include small holes 23 as the first holes of a first diameter and large holes 24 as the second holes of a second diameter that is larger than the first diameter. The small holes 23 are arranged at every 120 degrees in a circumferential direction on the basis of a center P of the shaft hole 22. The number of small holes 23 is three in the embodiment. The large holes 24 are each located between the two adjacent small holes 23 and arranged at every 120 degrees in a circumferential direction on the basis of the center P of the shaft hole 22. The number of large holes 24 is three in the embodiments. Thus, in each of the laminated steel plates 14 in the embodiment, six holes around the shaft hole 22, that is, the small holes 23 and the large holes 24 are alternately arranged in the circumferential direction. The small holes 23 and the large holes 24 alternately arranged are arranged at every 60 degrees on the basis of the center P of the shaft hole 22 at equal intervals in the circumferential direction of the laminated steel plates 14. A distance a from the center P of the shaft hole 22 to a center of each small hole 23 is the same distance as that from the center of the shaft hole 22 to a center of each large hole 24. Therefore, the centers of the 6 holes configured of the small holes 23 and the large holes 24 are located on a circumference of a circle whose center is the center P of the shaft hole 22 and whose radius is the distance a, that is, on the same circumference.

Referring to FIG. 2, the rotor core 15 is configured by laminating the plurality of laminated steel plates 14. End plates 25, 26 made of non-magnetic material (for example, aluminum) are fixed to opposite end portions of the rotor core 15. The laminated steel plates 14 located in the opposite end portions of the rotor core 15 are defined as laminated steel plates 14a, 14b, respectively. The end plate 25 is fixed so as to adjoin the laminated steel plate 14a, and the end plate 26 is fixed so as to adjoin the laminated steel plate 14b. The rotor core 15 and the end plates 25, 26 are fastened by fastening members. The fastening members of the embodiment correspond to rivets 28 illustrated in FIG. 2. In the embodiment, three of the rivets 28 are used for fastening the end plate 25 and three of the rivets 28 are also used for fastening the end plate 26. The rivets 28 are blind rivets with which a base material is fastened from one side of the base material. In FIG. 2, blind rivets, which are to be fastened, are illustrated. FIG. 2 illustrates a flange 28a and a rivet main body 28b as components of each blind rivet.

The end plates 25, 26 are substantially disk-like plates which have a shape substantially identical to a shape of each laminated steel plate 14. The end plates 25, 26 are identically shaped. The end plates 25, 26 are thick plates compared to each laminated steel plate 14 so that the end plates 25, 26 may be machined in adjusting balance of rotation of the rotor 11. The end plates 25, 26 each have a shaft hole 30 through which the shaft 13 is inserted. The end plates 25, 26 also have holes 31, 32 perforated through which the rivets 28 are inserted, respectively. In the embodiment, the holes 31, 32 are perforated in positions corresponding to the small holes 23 of the laminated steel plates 14 when the laminated steel plates 14 and the end plates 25, 26 are laminated. Thus, the holes 31, 32 are arranged at every 120 degrees on the basis of the center of the shaft hole 30 in a circumferential direction.

The following will describe a rotor structure of the embodiment, especially a mounting structure of the rotor core 15 and the end plates 25, 26 as a main topic. The rotor 11 includes the rotor core 15 formed by laminating the plurality of laminated steel plates 14, permanent magnets 18, 19 disposed in the rotor core 15, and the end plates 25, 26 fastened to the opposite end portions of the rotor core 15, respectively.

When the rotor core 15 is formed by laminating the plurality of laminated steel plates 14 like the rotor 11 of the embodiment, the laminated steel plates 14 are fixed by, for example, a crimp processing. In order to prevent an inclination which may be generated due to the variation in the thickness of the laminated steel plates 14, the rotor core 15 is formed by performing a rotational lamination processing. In the rotational lamination processing, the laminated steel plates 14 that have been laminated are rotated by a prescribed angle each time one or more laminated steel plates 14 are newly laminated so that the variation of the thickness of the laminated steel plates 14 is uniform.

The rotor 11 of the embodiment is improved in the mounting structure of the rotor core 15 and the end plates 25, 26 by utilizing the rotational lamination processing of the laminated steel plates 14 that is performed when the rotor core 15 is formed as described above.

In the structure of the rotor 11 of the embodiment, the laminated steel plates 14 that configure a portion through which rivet main bodies 28b are not inserted are rotationally laminated by prescribed angles relative to the laminated steel plates 14 that configure a portion through which the rivet main bodies 28b are inserted. Although the following will specifically describe the structure of the rotor 11, for ease of description, the portion through which the rivet main bodies 28b are inserted is defined as a first laminated portion S1, and the portion through which the rivet main bodies 28b are not inserted is defined as a second laminated portion S2 in the exploded perspective view of the rotor 11 illustrated in FIG. 2. The plurality of laminated steel plates 14 laminated in the first laminated portion S1 are fixed in such a manner that the small holes 23 and the large holes 24 are each continued in a longitudinal direction of the rotor core 15.

The end plates 25, 26 are respectively fixed to the opposite end portions of the rotor core 15 in the rotor 11. This means that the rotor 11 has two first laminated portions S1 as illustrated in FIG. 2. The second laminated portion S2 is interposed between the two first laminated portions S1 to which the end plates 25, 26 are respectively fixed. In addition, the first laminated portion S1 to which the end plate 25 is fixed is located in a first end of the rotor core 15, and is the portion in which the plurality of laminated steel plates 14 including the laminated steel plate 14a adjacent to the end plate 25 are laminated. On the other hand, the first laminated portion S1 to which the end plate 26 is fixed is located in a second end of the rotor core 15 opposed to the first end of the rotor core 15, and is the portion in which the plurality of laminated steel plates 14 including the laminated steel plate 14b adjacent to the end plate 26 are laminated. The number of the laminated steel plates 14 in each first laminated portion S1 depends on a length of the rivet main bodies 28b.

In the second laminated portion S2, the plurality of laminated steel plates 14 including the laminated steel plate 14c adjacent to the first laminated portion S1 to which the end plate 25 is fixed are rotationally laminated in such a manner that the large holes 24 are connected to the small holes 23 connectively arranged in the longitudinal direction of the rotor core 15 in the first laminated portion S1. Similarly, of the second laminated portion S2, the plurality of prescribed laminated steel plates 14 including the laminated steel plate 14d adjacent to the first laminated portion S1 to which the end plate 26 is fixed are rotationally laminated in such a manner that the large holes 24 are connected to the small holes 23 connectively arranged in the longitudinal direction of the rotor core 15 in the first laminated portion S1. Therefore, at least a part of the second laminated portion S2, that is, a part adjacent to the first laminated portion S1 is rotationally laminated by angles (for example, 60 degrees or 180 degrees) by which the large holes 24 overlap with the small holes 23 of the first laminated portion S1 in the longitudinal direction, FIG. 3 is a cross-sectional view showing the rotor core 15 and the end plate 25 fastened by the rivet 28. Although FIG. 3 shows one fastened portion in the end plate 25, the other two fastened portions have the same configuration. As described above, when at least a part of the second laminated portion S2 is rotationally laminated relative to each first laminated portion S1, a hole diameter of an inserted portion of the rivet 28 is different at a boundary between each first laminated portion S1 and the second laminated portion S2. Specifically, the hole diameter changes from a diameter of the small holes 23 to a diameter of the large holes 24. With this configuration, in a state of the rotor core 15 formed by laminating the required number of the laminated steel plates 14, the end plate 25 is laminated on the laminated steel plate 14a located in the first end of the rotor core 15, and then, may be fastened after inserting the rivet 28 into the hole 31 of the end place 25 and the small holes 23 of the laminated steel plates 14. Accordingly, in the fastening process of a blind rivet, a fastening portion 28c having a larger diameter than that of the rivet main body 28b is newly formed in an end of the rivet main body 28b. This fastening portion 28c is to be inserted to the large holes 24 of the second laminated portion S2. Thus, the end plate 25 and the laminated steel plates 14 of the first laminated portion S1 are held by a bearing seat Z1 of the flange 28a and a bearing seat Z2 of the fastening portion 28c. As a result, the end plate 25 is fastened to the rotor core 15. The above-mentioned fastening of the end plate 25 and the rotor core 15 applies to the fastening of the end plate 26 and the rotor core 15.

The lamination number of laminated steel plates 14 in the second laminated portion S2 is more than that of laminated steel plates 14 in each first laminated portion S1. This lamination number is determined by a size of the required rotor 11 in the motor 10. In other words, the second laminated portion S2 is longer than each first laminated portion S1 in the longitudinal direction of the rotor core 15. With this configuration, although the small holes 23 and the large holes 24 need to be laminated in a portion where the second laminated portion S2 is overlapped with the first laminated portion S1 in the longitudinal direction of the rotor core 15 as illustrated in FIG. 3, rotational lamination may be performed in multiple times in a plurality of portions. Therefore, in the structure of the rotor 11 of the embodiment, angles for rotational lamination of the second laminated portion S2 are no matter in portions where the fastening portions 28c after fastening are not to be inserted.

The following will describe an operation of the rotor structure of the embodiment.

The laminated steel plates 14 configuring the rotor core 15 include the small holes 23 and the large holes 24. The laminated steel plates 14 of the rotor core 15 are rotationally laminated in such a manner that the small holes 23 through which the rivet main bodies 28b are inserted and the large holes 24 through which the rivet main bodies 28b are not inserted are connected in the longitudinal direction of the rotor core 15. This configuration shortens a length of portions through which the rivets 28 are inserted to fix the end plates 25, 26 in the rotor core 15. Thus, the end plates 25, 26 may be fastened to the rotor core 15 without needing the rivets 28 having a length corresponding to an overall length of the rotor core 15.

The following will describe a relationship between the number of poles of the motor 10 and a total hole number of the small holes 23 and the large holes 24 perforated in each laminated steel plate 14.

The total hole number of the small holes 23 and the large holes 24 relative to the number of poles of the motor 10 is determined on the basis of value A calculated by using the following Equations (1) and (2), when P is the number of poles, n is a positive integer, and m is a positive odd integer.

$$P \div n = B \quad \text{Equation (1) and}$$

$$B \times m = A \quad \text{Equation (2),}$$

where value B for calculating value A in the Equation (2) is a positive even integer of the values calculated by the Equation (1). The total hole number is defined as a positive even integer equal to or greater than four of values A calculated by the Equation (2).

The number of poles and the total hole number will be specifically exemplified below.

In the case where the motor 10 has "six" poles as described in the embodiment, value B=6, 2 by the Equation (1). When value B=6, value A=6, 18, 30, 42 . . . by the Equation (2). When value B=2, value A=6, 10, 14, 18 . . . by the Equation (2). Thus, a total hole number is determined from 6, 10, 14, 18 . . . in the case where the motor 10 has "six" poles.

It is preferable that the holes perforated in the laminated steel plates 14 (the small holes 23 and the large holes 24) are arranged alternatively at equal intervals, considering balance during rotation. For this reason, it is preferable that the total hole number is determined as a positive even integer equal to or greater than four of values A calculated by the Equation (2).

A total hole number in the motor 10 having "four" poles is determined from value A=4, 6, 10, 12 . . . , calculated by the above Equations (1) and (2). A total hole number in the motor 10 having "18" poles is determined from value A=6, 10, 14, 18, 22 . . . calculated by the above Equations (1) and (2). When the total hole number is determined on the basis of the Equations (1) and (2), the total hole number relative to the number of poles is appropriately determined. Centers of the poles of the motor 10 need not correspond to positions of the holes (positions of the small holes 23 and the large holes 24).

This embodiment has the following advantages.

(1) The end plates 25, 26 may be fastened in the first laminated portions S1 by rotational lamination such that the large holes 24 of the second laminated portion S2 are connected to the small holes 23 of each first laminated portion S1. This means that the end plates 25, 26 may be fixed to the rotor core 15. Therefore, the rotor core 15 and the end plates 25, 26 may be fastened without needing the rivets 28 having a length corresponding to a size (a length) of the rotor 11.

(2) In other words, the length of the first laminated portion S1 is shorter than that of the rotor 11. With this configuration, the end plates 25, 26 are fixed to the end portions of the rotor core 15 without needing the rivets 28 having a length corresponding to an overall length of the rotor 11. Thus, a rotor structure that is applicable to even the motor 10 including the large rotor 11 may be provided.

(3) The rotor structure of the embodiment does not need the rivets 28 having a length corresponding to a length of the rotor 11, so that the rivets 28 fixing the rotor core 15 and the end plates 25, 26 may be commonized regardless of a size of the rotor 11. This may reduce manufacturing costs of the motor 10 and simplify a manufacturing method of the motor 10.

(4) The rotor structure of the embodiment is superior in workability because an operation of fixing the end plates 25, 26 to the rotor core 15 is allowable on each side.

(5) The small holes 23 and the large holes 24 are arranged alternately at equal intervals. This does not generate imbalance of the laminated steel plates 14 caused by the small holes 23 and the large holes 24. Therefore, the workload for adjusting rotation balance of the rotor 11 is not increased.

(6) Using the rivets 28 for fastening the end plates 25, 26 and the laminated steel plates 14 of the first laminated portions S1 facilitates a fastening process.

(7) The end plates 25, 26 and the laminated steel plates 14 of the first laminated portions S1 are each held by the bearing seats Z1, Z2 of the rivets 28. This firmly fixes the end plates 25, 26 to the rotor core 15.

The above embodiment may be modified as described below.

Fastening members to fasten the end plates 25, 26 to the rotor core 15 may be bolts and nuts. This means that the end plate 25 and the first laminated portion S1, and the end plate 26 and the first laminated portion S1 are each held by bearing seats of fastening members as described in the embodiment. When bolts and nuts are used, the end plate 25 and the first laminated portion S1 and the end plate 26 and the first laminated portion S1 are each fixed, and then, these first laminated portions S1 are fixed to the second laminated portion S2.

Each laminated steel plate 14 configuring the rotor core 15 may be fixed by not only a crimp processing but also a welding processing or an adhesion processing.

The shaft 13 and the rotor core 15 may be fixed by a key. When the shaft 13 and the rotor core 15 are fixed by a key, rotational lamination processing is performed by considering positions of the key and a key groove.

As described in the embodiment, the hole numbers (the total number of the small holes 23 and the large holes 24) relative to the number of poles of the motor 10 may be arbitrarily changeable. The number of poles of the motor 10 described in the embodiment is an exemplification, and may be arbitrarily changeable. When the number of poles is changed, the small holes 23 and the large holes 24 corresponding to the hole numbers described in the embodiment 24 are perforated in the laminated steel plates 14.

A diameter of the small holes 23 and a diameter of the large holes 24 may be arbitrarily changeable in accordance with a shape of fastening member to be used. For example, when the rivets 28 are used, the small holes 23, through which the rivet main bodies 28b are insertable, have a smaller diameter than that of the bearing seats Z1, Z2, and the large holes 24 have a larger diameter than that of the fastening portions 28c.

REFERENCE SIGNS LIST 10 motor
14, 14a to 14d laminated steel date
11 rotor
15 rotor core
18, 19 permanent magnet
25, 26 end plate
23 small hole
24 large hole
28 rivet
31, 32 hole
S1 first laminated portion
S2 second laminated portion
Z1, Z2 bearing seat

The invention claimed is:

1. A rotor structure of a motor comprising:
a rotor core formed by laminating a plurality of laminated steel plates;
a permanent magnet disposed in the rotor core; and
end plates fastened to opposite end portions of the rotor core, respectively, wherein
first holes of a first diameter and second holes of a second diameter that is larger than the first diameter are perforated alternately in a circumferential direction at equal intervals in each of the laminated steel plates,
the end plates have holes through which fastening members are inserted, the fastening members including first fastening members and second fastening members, the end plates are respectively fixed to the end portions of the rotor core by the fastening members inserted to the holes, and when the rotor core is divided into a pair of first laminated portions in which the plurality of the laminated steel plates including the laminated steel plates adjacent to the end plates are laminated, and a second laminated portion interposed between the first laminated portions, and in the second laminated portion, the plurality of the laminated steel plates including the laminated steel plates adjacent to the first laminated portions are laminated and rotated with respect to the plurality of the laminated steel plates in the first laminated portions in such a manner that the second holes in the second laminated portion are connected to the first holes in the first laminated portions, wherein the first holes are connectively arranged in a longitudinal direction of the rotor in the first laminated portions, wherein the end plates are respectively fixed to the end portions of the rotor core by the fastening members inserted through the holes and the first holes of the plurality of the laminated steel plates that include the laminated steel plates adjacent to the end plates, and one of the end plates and the adjacent first laminated portion are held by bearing seats of the first fastening members and the other one of the end plates and the adjacent first laminated portion are held by bearing seats of the second fastening members.

2. The rotor structure of the motor according to claim 1, wherein the fastening members are rivets.

3. The rotor structure of the motor according to claim 1, wherein a total hole number of the first holes and the second holes relative to the number of poles of the motor is determined on the basis of value A calculated by using the following Equations (1) and (2), when P is the number of poles, n is a positive integer, and m is a positive odd integer, $$P \div n = B \qquad \text{Equation (1) and}$$

$$B \times m = A \qquad \text{Equation (2),}$$

where value B for calculating value A in the Equation (2) is a positive even integer of the values calculated by the Equation (1), and the total hole number is defined as a positive even integer equal to or greater than four of values A calculated by the Equation (2).

4. The rotor structure of the motor according to claim 1, wherein the bearing seats of the first fastening members and the bearing seats of the second fastening members are disposed in the second holes in the second laminated portion.

* * * * *